(12) United States Patent
Ju et al.

(10) Patent No.: US 9,724,977 B2
(45) Date of Patent: Aug. 8, 2017

(54) REAR AIR CONDITIONER FOR VEHICLE

(71) Applicant: Halla Visteon Climate Control Corp., Daejeon (KR)

(72) Inventors: Youngbok Ju, Daejeon (KR); Jongsu Kim, Daejeon (KR); Honghee Jeong, Daejeon (KR); Hanjun Kang, Daejeon (KR); Donghyun Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 483 days.

(21) Appl. No.: 14/094,998

(22) Filed: Dec. 3, 2013

(65) Prior Publication Data

US 2014/0158319 A1    Jun. 12, 2014

(30) Foreign Application Priority Data

Dec. 6, 2012  (KR) .......................... 10-2012-0141014
Dec. 26, 2012 (KR) .......................... 10-2012-0152865

(51) Int. Cl.
*B60H 1/02*     (2006.01)
*B60H 1/00*     (2006.01)

(52) U.S. Cl.
CPC ..... *B60H 1/00021* (2013.01); *B60H 1/00542* (2013.01); *B60H 1/00685* (2013.01); *B60H 2001/002* (2013.01); *B60H 2001/00192* (2013.01); *B60H 2001/00242* (2013.01)

(58) Field of Classification Search
CPC .......... B60H 2001/00092; B60H 2001/00192; B60H 2001/00242; B60H 1/00207; B60H 1/00021

USPC ................................................. 165/202, 204
See application file for complete search history.

(56) References Cited

U.S. PATENT DOCUMENTS

| | | | | |
|---|---|---|---|---|
| 5,149,300 A | * | 9/1992 | Barrett ...................... | F24F 7/06 454/232 |
| 6,655,163 B1 | | 12/2003 | Scherer et al. | |
| 2006/0000594 A1 | * | 1/2006 | Kang ................. | B60H 1/00064 165/203 |
| 2007/0204985 A1 | * | 9/2007 | Fukagawa .......... | B60H 1/00685 165/203 |

(Continued)

FOREIGN PATENT DOCUMENTS

| | | |
|---|---|---|
| FR | 2 839 017 A1 | 10/2003 |
| JP | 6-44601 A | 6/1994 |

(Continued)

*Primary Examiner* — Devon Russell
(74) *Attorney, Agent, or Firm* — Norton Rose Fulbright US LLP; James Crawford

(57) ABSTRACT

A rear air conditioner for a vehicle including a discharge module mounted at an air outflow port of an air-conditioning case and having a discharge case and a rotary mode door; two face vents formed at both side walls of the discharge case; a floor vent formed at the center of the discharge case; and an air mixing zone formed inside the rotary mode door, thereby reducing the size of the air conditioner because a plurality of the vents are intensively arranged in the discharge case, enhancing installability due to the modulated components, reducing a temperature difference of the air discharged to the left and right sides inside the vehicle due to an improved mixability. The inside of the rotary mode door can be utilized as the air mixing zone. The degrees of opening of the face vents and the floor vent are controlled by the single mode door.

11 Claims, 12 Drawing Sheets

(56) References Cited

U.S. PATENT DOCUMENTS

2008/0156887 A1* 7/2008 Stanimirovic ....... F24F 11/0086
 236/12.1
2013/0020064 A1* 1/2013 Almori .............. B60H 1/00385
 165/204

FOREIGN PATENT DOCUMENTS

| JP | 09-118121 A | 5/1997 |
| JP | 2002-362132 A | 12/2002 |
| JP | 2005-186694 A | 7/2005 |
| JP | 2007-083774 A | 4/2007 |
| KR | 10-2012-0018840 A | 3/2012 |

* cited by examiner

Prior Art

Prior Art

US 9,724,977 B2

REAR AIR CONDITIONER FOR VEHICLE

This application claims priority from Korean Patent Application Nos. 10-2012-0141014 filed on Dec. 6, 2012 and 10-2012-0152865 filed on Dec. 26, 2012, which are hereby incorporated by reference in their entireties.

BACKGROUND OF THE INVENTION

Field of the Invention

The present invention relates to a rear air conditioner for a vehicle, and more particularly, to a rear air conditioner for a vehicle, which includes: a discharge module mounted at an air outflow port of an air-conditioning case and having a discharge case and a rotary mode door; two face vents formed at both side walls of the discharge case; a floor vent formed at the center of the discharge case; and an air mixing zone formed inside the rotary mode door.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

A conventional air conditioner for a vehicle is a front air conditioner in which air for cooling or heating is discharged from a discharge port formed in an instrument panel of the front part inside the vehicle. Therefore, some of luxury cars or SUVs (Sport Utility Vehicles) having a wide interior space cannot sufficiently provide the cooling or heating effect to the rear seats.

Therefore, in order to promote the cooling and heating performances to the rear seats in the case of the luxury cars or SUVs having the wide interior space, as shown in FIG. 1, a rear air conditioner 1 is additionally installed above a rear wheel cover 5 of the vehicle.

The rear air conditioner 1 includes an air-conditioning case 10 having an air inflow port (not shown) formed at one side of a scroll case 11 disposed at an inlet and a plurality of air outflow ports 16 formed at an outlet; an evaporator 14 and a heater core 15 spaced apart from each other at a predetermined interval in order inside the air-conditioning case 10; a temperature-adjusting door (not shown) mounted between the evaporator 14 and the heater core 15 for adjusting temperature by controlling a mixed amount of cold air and warm air; and a mode door (not shown) mounted at the air outflow port 16 for controlling the degree of opening of the air outflow port 16 according to air-conditioning modes.

Moreover, an air blower 20 for inhaling air from the air inflow port and blowing the inhaled air to the inside of the air-conditioning case 10 is mounted inside the scroll case 11.

The air outflow port 16 includes: a face vent 17 for blowing the air heat-exchanged inside the air-conditioning case 10 toward the upper body of a passenger through a roof inside the vehicle; and a floor vent 18 for blowing the heat-exchanged air toward the passenger's feet.

Therefore, the air blown through the air blower 20 is supplied to the inside of the air-conditioning case 10 along the inner wall surface of the scroll case 11.

Continuously, the air supplied to the inside of the air-conditioning case 10 is cooled while passing through the evaporator 14, and after that, bypasses the heater core 15 by the temperature-adjusting door or passes through the heater core 15.

The cold air bypassing the heater core 15 and the warm air passing through the heater core 15 are mixed together, and then, the mixed air is discharged to the inside of the vehicle through the face vent 17 and the floor vent 18.

Furthermore, the rear air conditioner may have one or two face vent 17 according to structures and forms of vehicles.

That is, as shown in FIG. 1, in case of the structure to discharge air toward the inside roof of the vehicle, because one roof duct is connected, one face vent 17 is formed, but as shown in FIG. 2, in case of the structure to discharge air toward the left and right sides inside the vehicle, because left and right ducts 30 and 40 are respectively connected, two face vents 17a and 17b are formed.

However, the rear air conditioner shown in FIG. 1 is favorable in mixability because there is just one face vent 17, but the rear air conditioner shown in FIG. 2 has several disadvantages in that the size of the air conditioner is increased because the two face vents 17a and 17b are formed in different positions, in that there is a large temperature difference between the air discharged to the left side and the air discharged to the right side inside the vehicle because the air discharged toward the face vent 17a and the air discharged toward the face vent 17b are not mixed, and in that the number of components and the manufacturing costs are increased because two mode doors (not shown) are needed to open and close the two face vents 17a and 17b.

SUMMARY OF THE INVENTION

Accordingly, the present invention has been made to solve the above-mentioned problems occurring in the prior arts, and it is an object of the present invention to provide a rear air conditioner for a vehicle, which includes: a discharge module mounted at an air outflow port of an air-conditioning case and having a discharge case and a rotary mode door; two face vents formed at both side walls of the discharge case; a floor vent formed at the center of the discharge case; and an air mixing zone formed inside the rotary mode door, thereby reducing the size of the air conditioner because a plurality of the vents are intensively arranged in the discharge case, enhancing installability due to the modulated components, reducing a temperature difference of the air discharged to the left and right sides inside the vehicle due to an improved mixability because the inside of the rotary mode door can be utilized as the air mixing zone, and reducing the number of components and manufacturing costs because the degrees of opening of the face vents and the floor vent are controlled by the single mode door.

To accomplish the above object, according to the present invention, there is provided a rear air conditioner for a vehicle including: an air-conditioning case having left and right body cases, an air inflow port formed at one side and an air outflow port formed at the other side; an evaporator and a heater core respectively mounted inside the air-conditioning case; and a discharge module which is mounted on the air outflow port of the air-conditioning case, the discharge module including a discharge case having a face vent and a floor vent for supplying air discharged from the air outflow port toward a rear seat inside the vehicle, and a mode door mounted inside the discharge case and for adjusting the degrees of opening of the face vent and the floor vent.

The rear air conditioner according to the exemplary embodiment of the present invention includes: the discharge module mounted at the air outflow port of the air-conditioning case and having the discharge case and the rotary mode door; the two face vents formed at both side walls of the discharge case; the floor vent formed at the center of the discharge case; and the air mixing zone formed inside the rotary mode door. Therefore, the rear air conditioner can be reduced in size and enhance installability due to the modulated components, because a plurality of the vents are intensively arranged in the discharge case.

Moreover, the rear air conditioner according to the exemplary embodiment of the present invention can reduce a temperature difference of the air discharged to the left and right sides inside the vehicle due to an improved mixability of cold air and warm air because the inside of the rotary mode door can be utilized as the air mixing zone.

Furthermore, the rear air conditioner according to the exemplary embodiment of the present invention can reduce the number of components and manufacturing costs because the left and right face vents and the floor vents are intensively arranged in the discharge case and are all opened and closed by the single rotary mode door.

In addition, the actuator for operating the mode door is mounted on one side wall of the discharge case which is located at the vent (small-sized vent), which is relatively low in static pressure, out of the left and right face vents. Therefore, the rear air conditioner for the vehicle according to the exemplary embodiment of the present invention can prevent reduction of air volume because the actuator does not stop the vent and can control air flow distribution and temperature because the size of the vent which is relatively high in static pressure.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
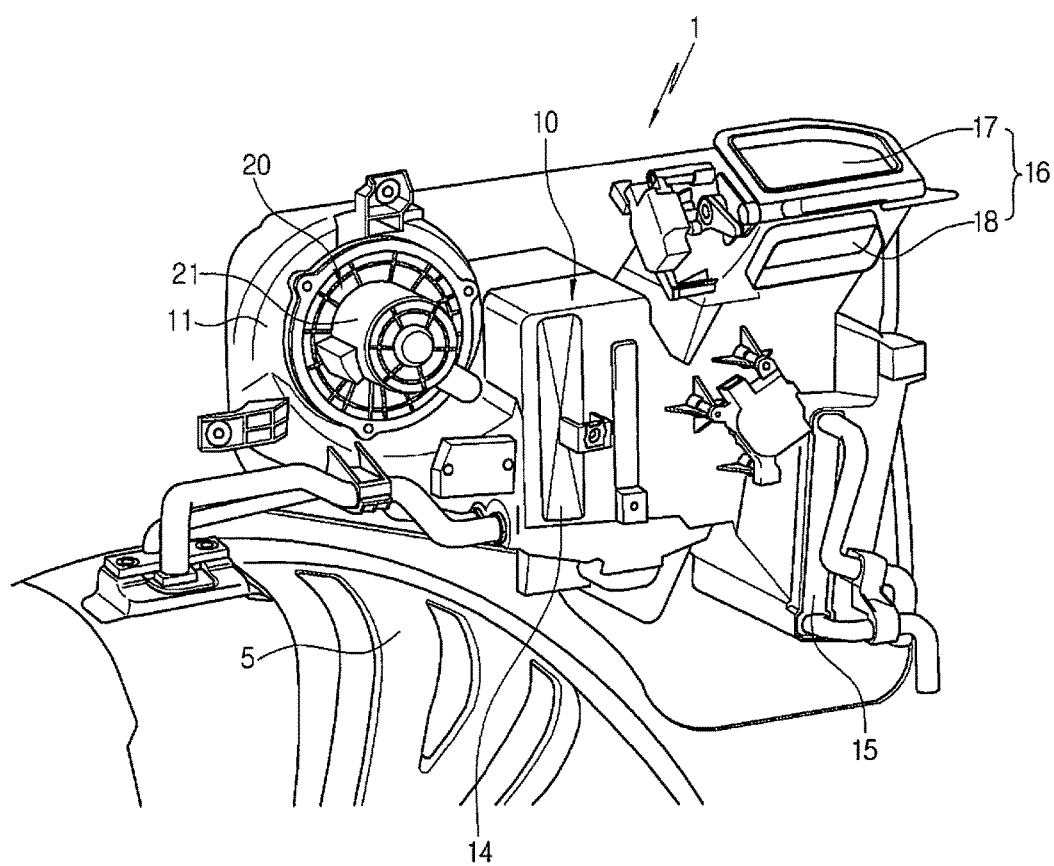
FIG. 1 is a perspective view of a conventional rear air conditioner.
Figure 2:
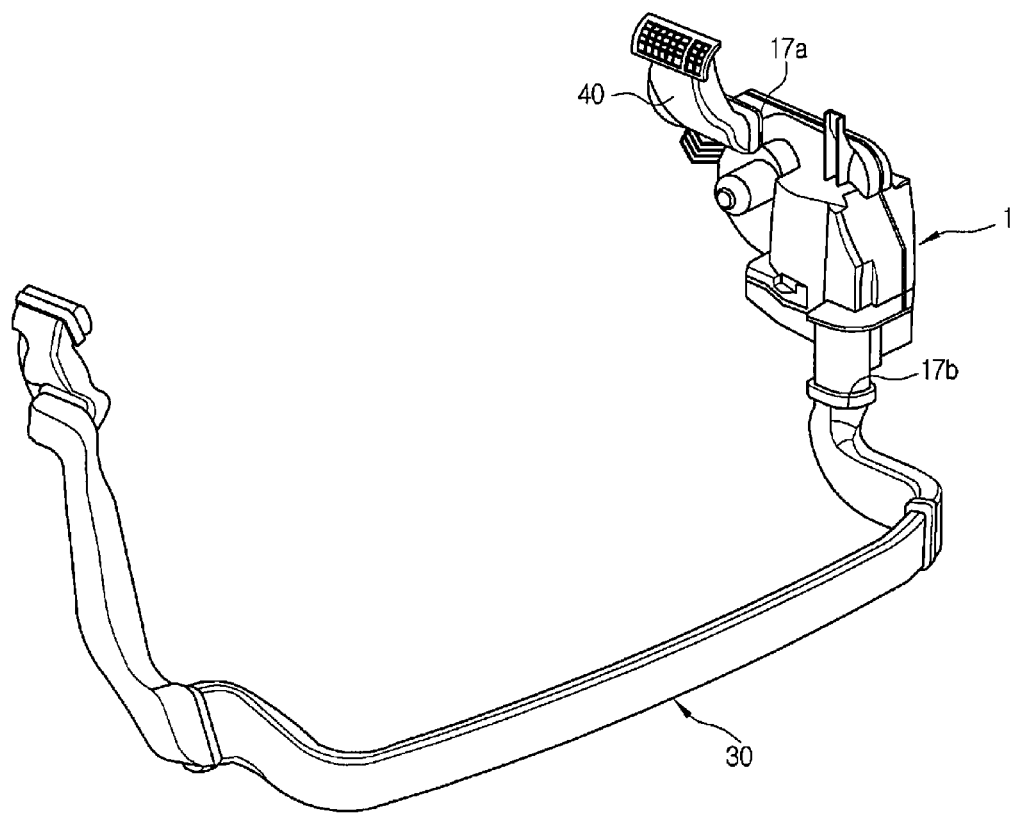
FIG. 2 is a perspective view of a conventional rear air conditioner according to another embodiment.
Figure 3:
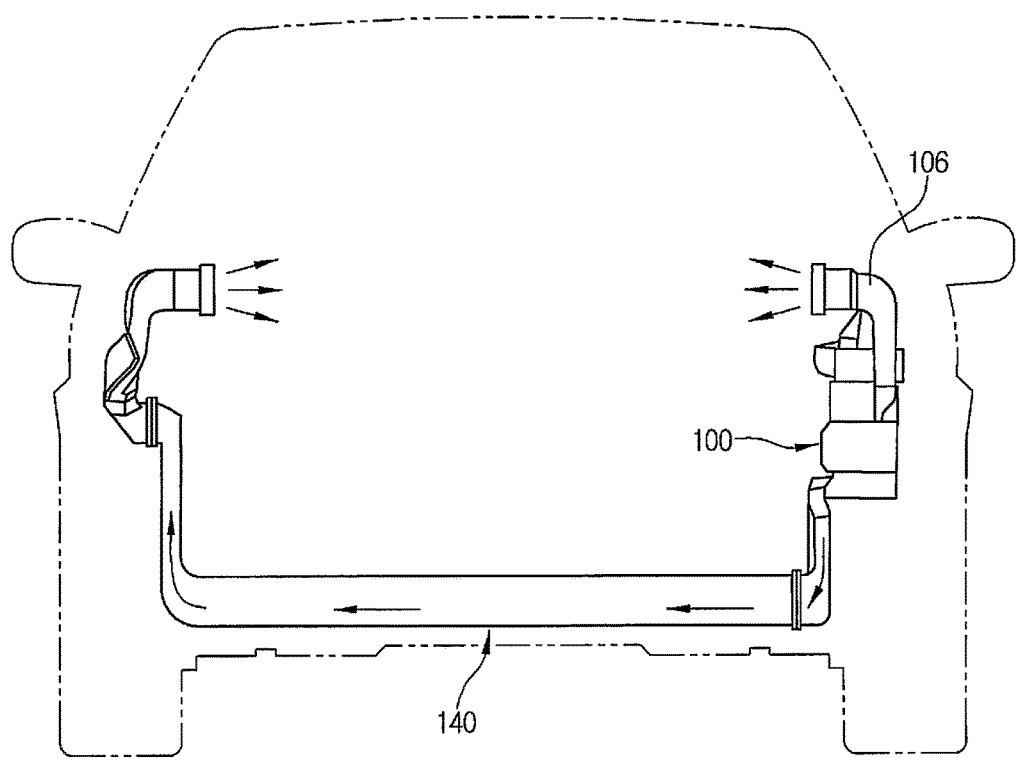
FIG. 3 is a schematic diagram showing a state where a rear air conditioner for a vehicle according to a preferred embodiment of the present invention is installed in the vehicle.
Figure 4:
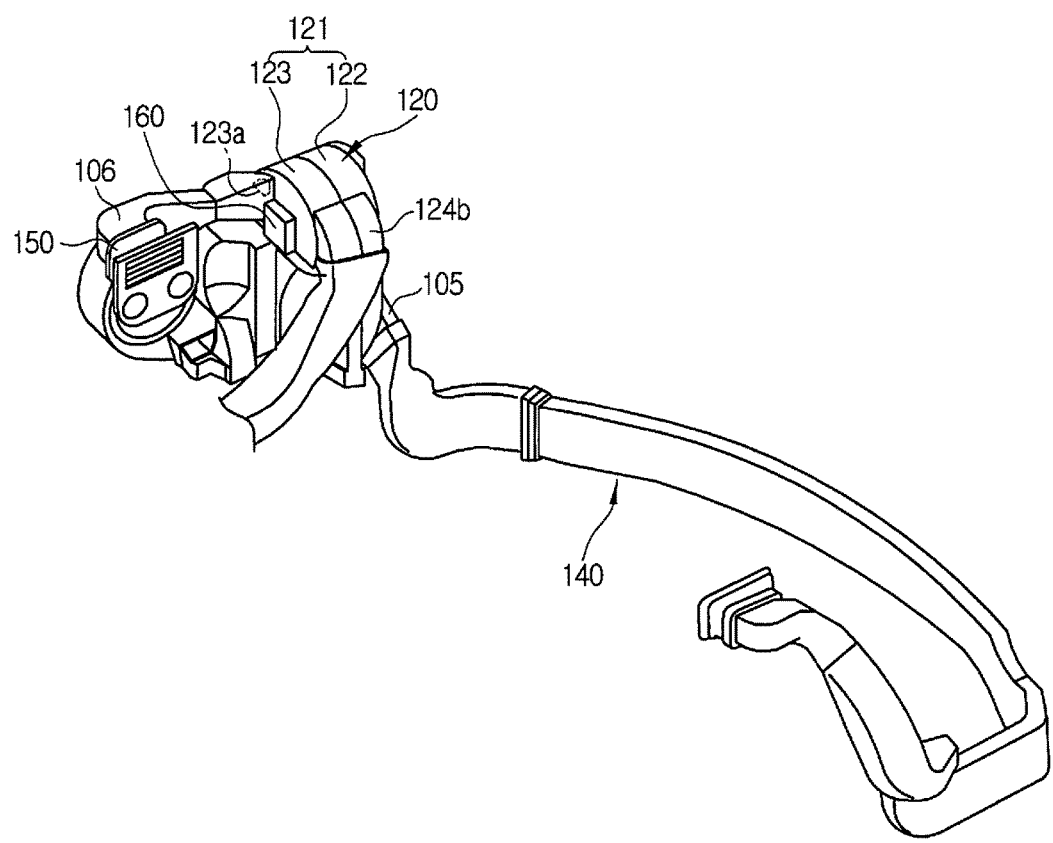
FIG. 4 is a perspective view showing a state where left and right ducts are connected to the rear air conditioner according to the preferred embodiment of the present invention.
Figure 5:
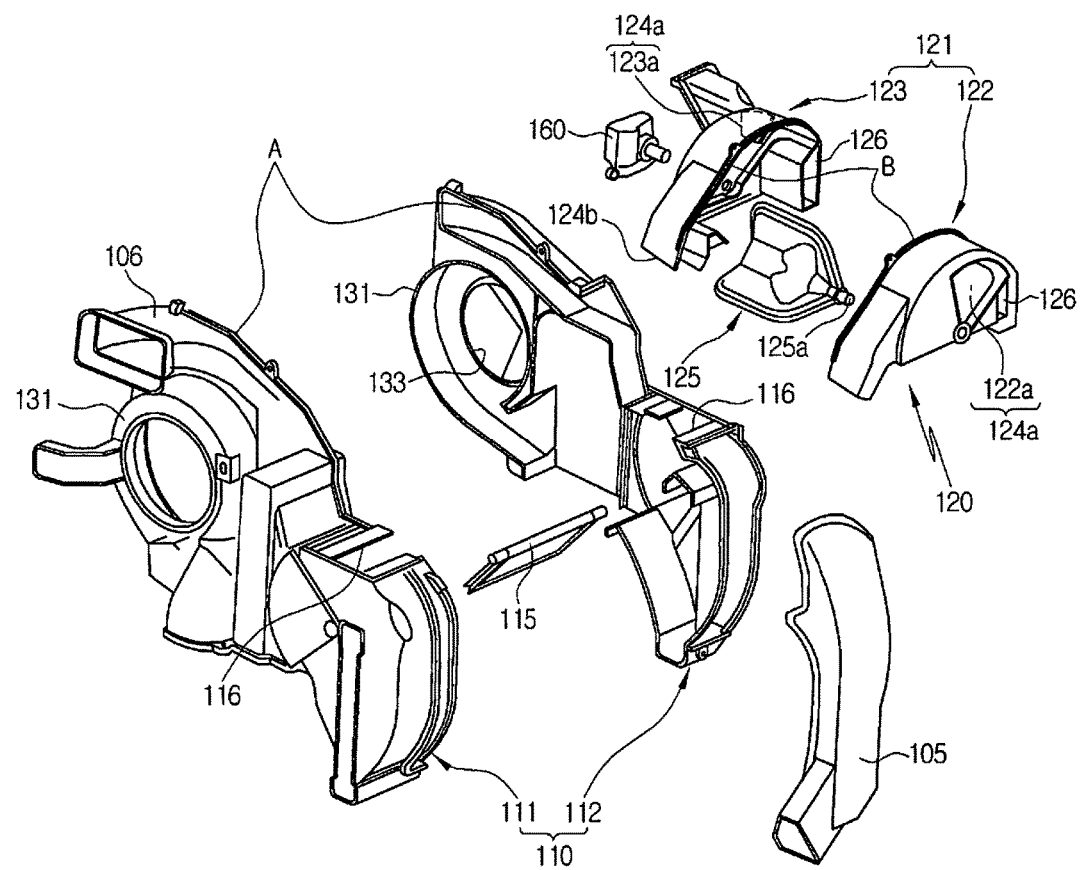
FIG. 5 is an exploded perspective view of the rear air conditioner according to the preferred embodiment of the present invention.
Figure 6:
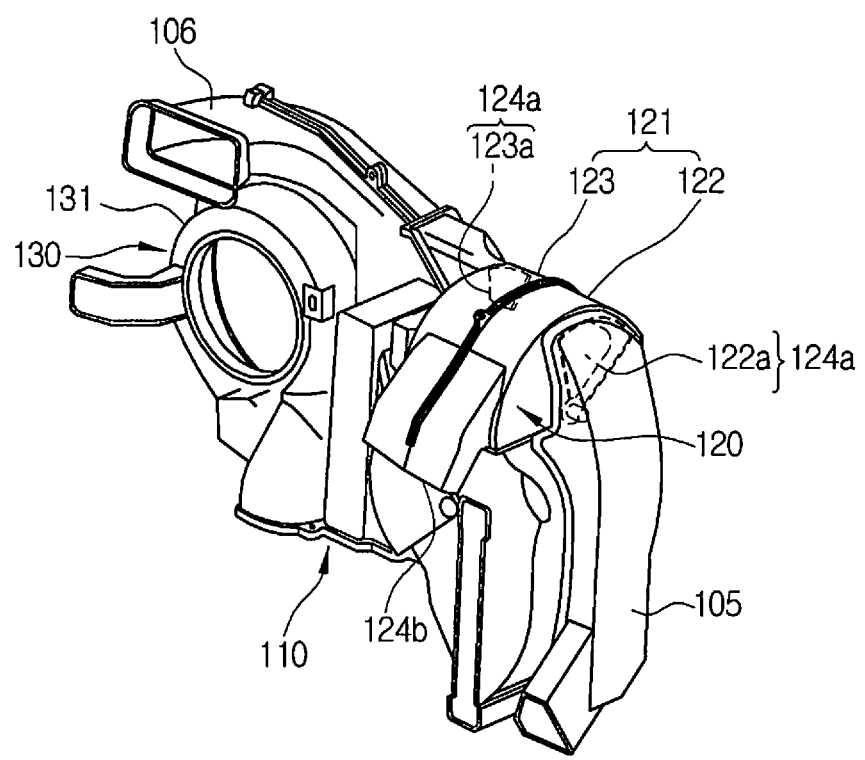
FIG. 6 is a perspective view showing an assembled state of the rear air conditioner according to the preferred embodiment of the present invention.
Figure 7:
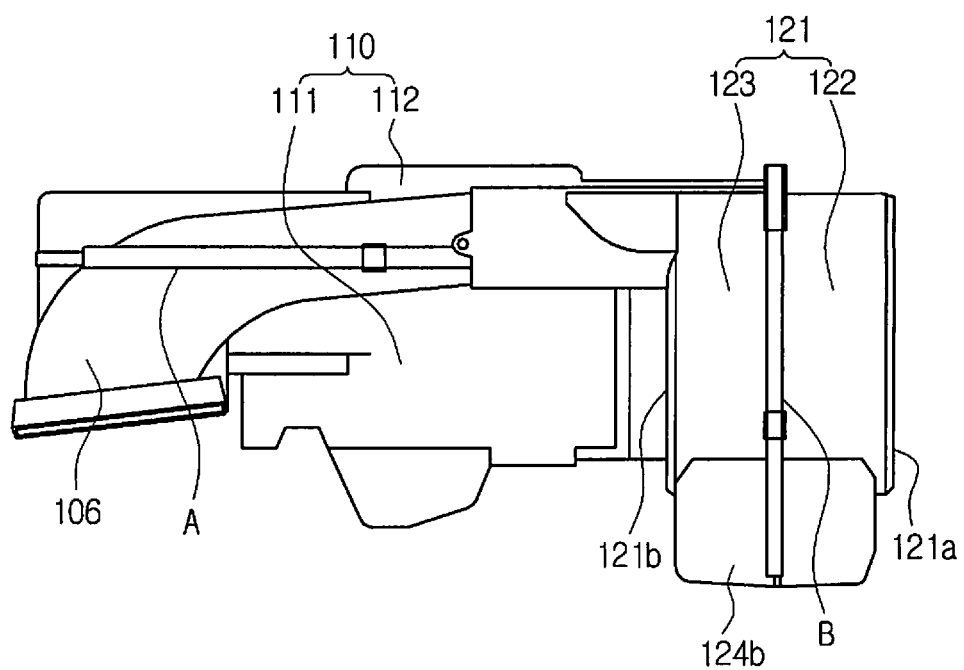
FIG. 7 is a plan view of FIG. 6.
Figure 8:
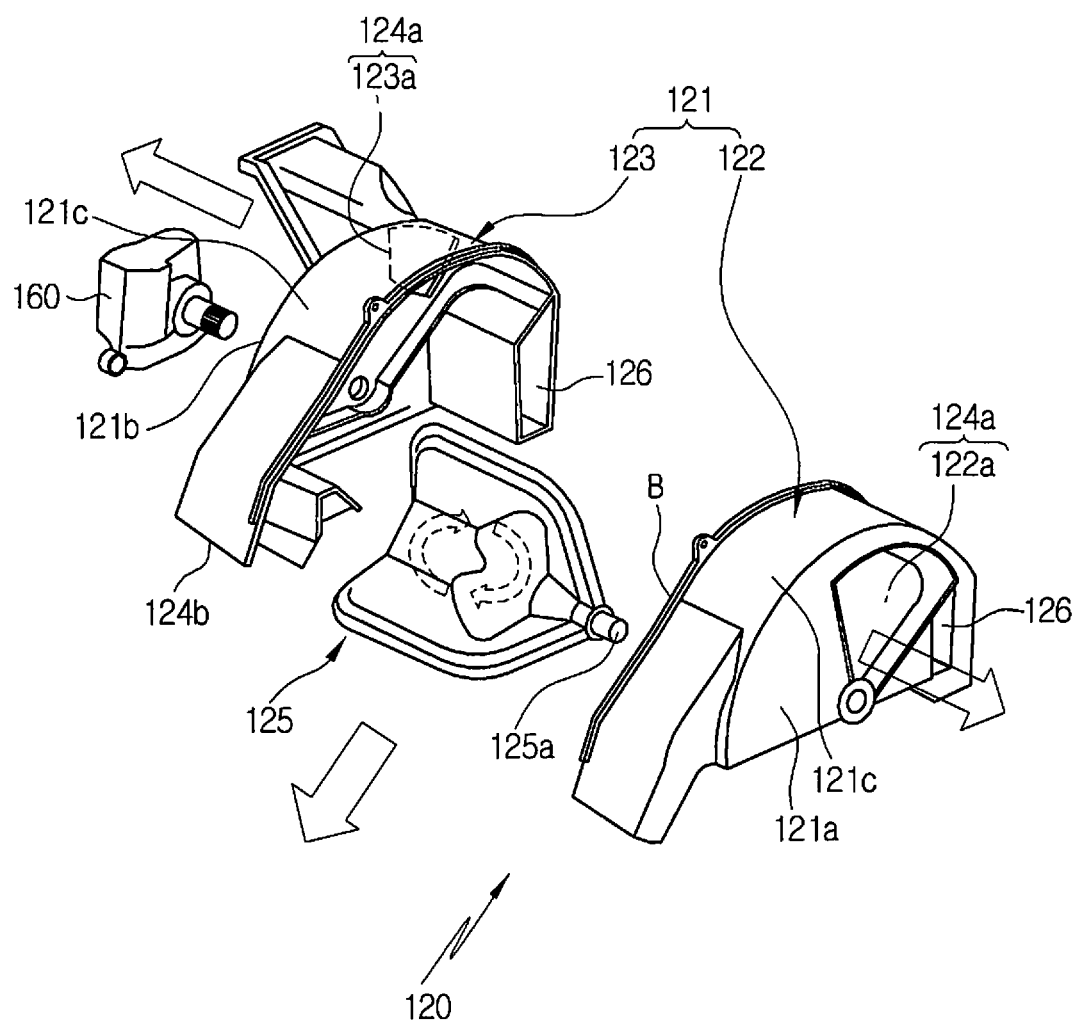
FIG. 8 is an exploded perspective view of a discharge module of the rear air conditioner according to the preferred embodiment of the present invention.
Figure 9:
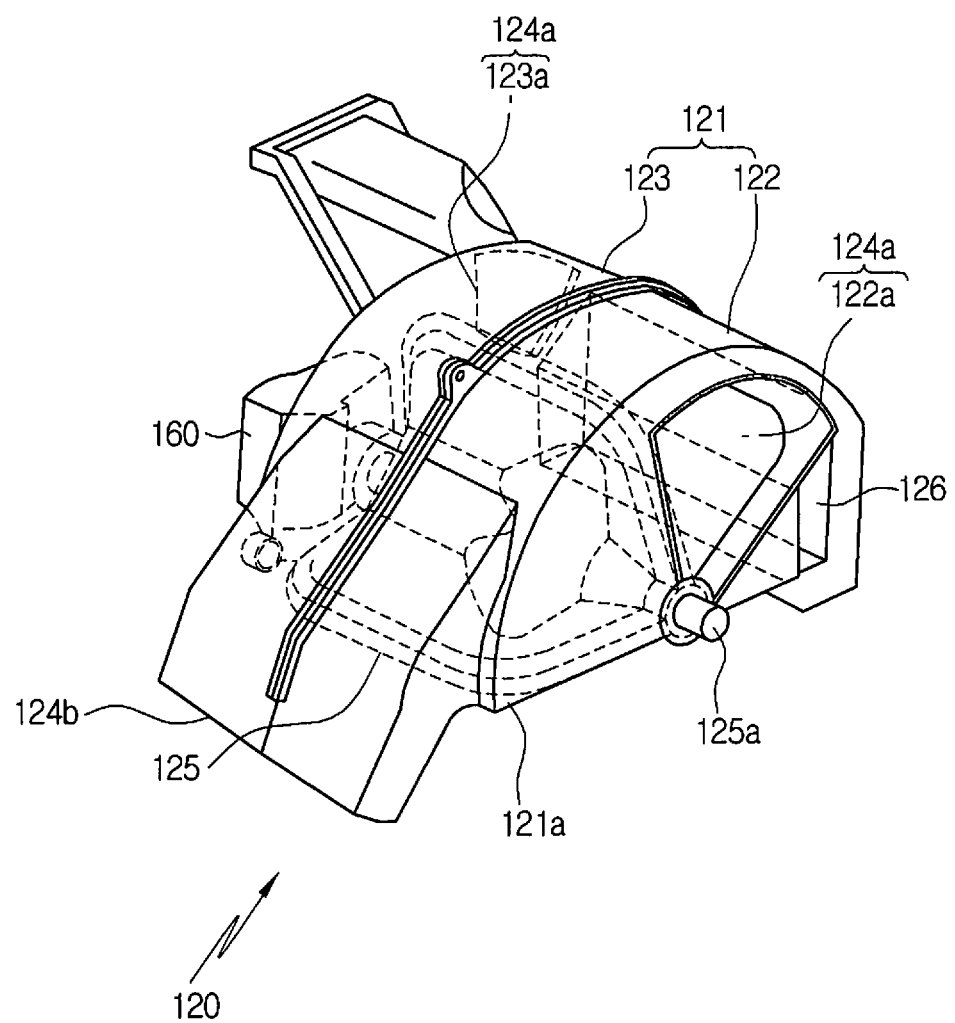
FIG. 9 is a perspective view showing an assembled state of the discharge module of the rear air conditioner according to the preferred embodiment of the present invention.
Figure 10:
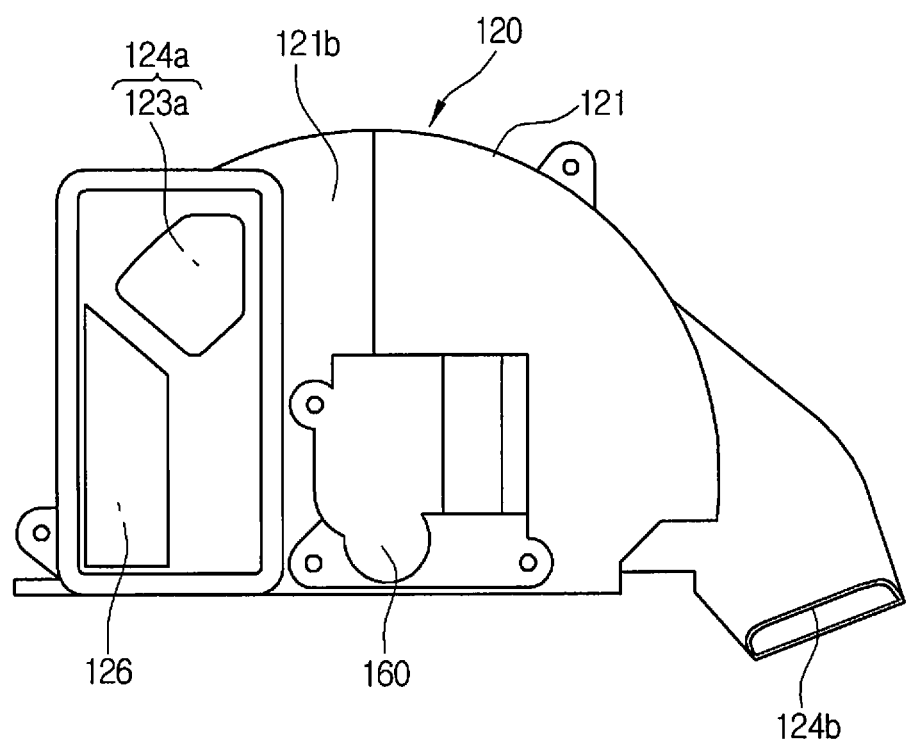
FIG. 10 is a side view of the rear air conditioner viewed from the position where the actuator of FIG. 9 is mounted.
Figure 11:
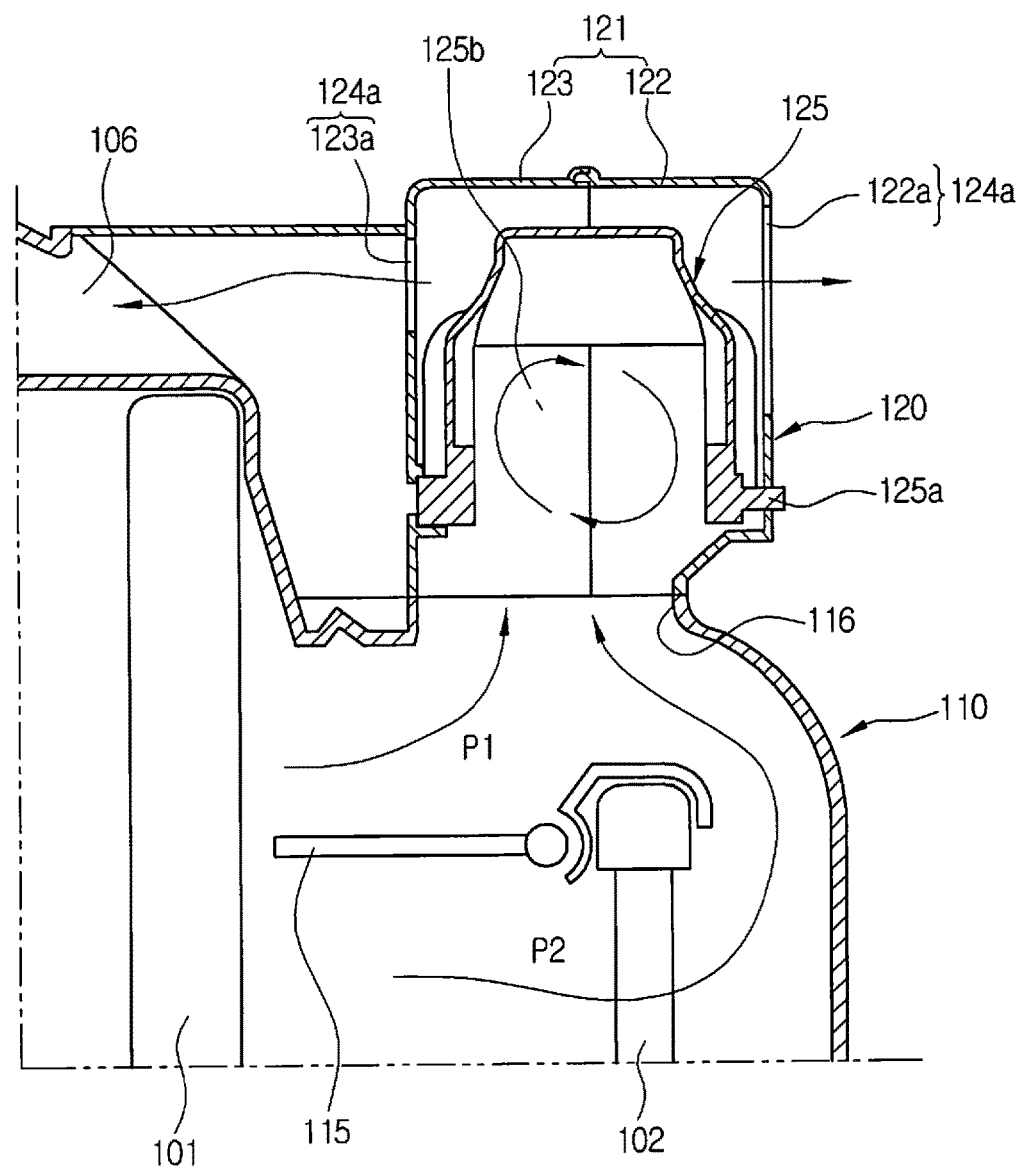
FIG. 11 is a sectional view showing a state where the discharge module is joined to an air outflow port of an air-conditioning case of the rear air conditioner for the vehicle according to the preferred embodiment of the present invention.

Reference will be now made in detail to the preferred embodiment of the present invention with reference to the attached drawings.

A rear air conditioner 100 for a vehicle according to a preferred embodiment of the present invention is installed in a side of the vehicle, namely, located above a rear wheel cover (not shown) and is installed in a space between an external panel (not shown) and an internal panel (not shown) of the side of the vehicle.

In the drawings, the rear air conditioner 100 is installed at the right side of the vehicle, but of course, the installation position of the rear air conditioner 100 can be changed according to kinds of vehicles.

The rear air conditioner 100 includes: an air-conditioning case 110 having an air passageway for allowing a flow of air; an air inflow port 133 formed at one side of the air-conditioning case 110; and an air outflow port 116 formed at the other side of the air-conditioning case 110.

The air-conditioning case 110 is constructed of a left body case 111 and a right body case 111 which are assembled together.

Moreover, an air blower 130 is disposed at the air inflow port 133 of the air-conditioning case 110, and includes: a scroll case 131 formed on the circumference of the air inflow port 133 of the air-conditioning case 110 in a scroll form; and a centrifugal fan 132 rotatably mounted inside the scroll case 131.

In this instance, the air inflow port 133 is formed at one side of the centrifugal fan 132 in an axial direction, and a motor (not shown) for driving the centrifugal fan 132 is mounted at the other side.

Therefore, when the centrifugal fan 132 is rotated, air is inhaled into the centrifugal fan 132 through the air inflow port 133 of the scroll case 131, and after that, the inhaled air moves along the inner wall surface of the scroll case 131 and is blown into the air-conditioning case 110 while being blown in a radial direction of the centrifugal fan 132.

Moreover, an evaporator 101 and a heater core 102 for cooling or heating the air blown from the air blower 130 are mounted in order at a predetermined interval inside the air-conditioning case 110.

Furthermore, a temperature-adjusting door 115 for adjusting temperature by controlling a mixing amount of cold air and warm air through a control of the degrees of opening of a cold air passageway P1 bypassing the heater core 102 and a warm air passageway P2 passing through the heater core 102 is mounted between the evaporator 101 and the heater core 102.

Here, the temperature-adjusting door 115 is a flat door.

Additionally, the air outflow port 116 of the air-conditioning case 110 is formed in an area where the cold air passing through the evaporator 101 and the warm air passing through the heater core 102 meet together.

In this instance, the air outflow port 116 crosses an assembly face A of the left and right body cases 111 and 112 at the area where the cold air and the warm air meet together, and is opened at the upper part as shown in the drawing.

In addition, a discharge module 120 is mounted at the air outflow port 116 of the air-conditioning case 110, such that the air discharged from the air outflow port 116 is supplied toward the upper body of the passenger who sits on the rear seat of the vehicle through a face vent 124a or is supplied toward the lower body of the passenger through a floor vent 124b according to air outflow modes.

The discharge module 120 is constructed by assembly of front and rear auxiliary cases 122 and 123, and includes: a discharge case 121 having the face vent 124a and the floor vent 124b for supplying the air discharged from the air outflow port 116 toward the rear seat of the vehicle; and a mode door 125 mounted inside the discharge case 121 for adjusting the degrees of opening of the face vent 124a and the floor vent 124b.

The discharge case 121 is opened at the lower part, and is assembled to the top of the air outflow port 116 of the air-conditioning case 110.

Meanwhile, the discharge case 121 may not be divided into the front and rear auxiliary cases 122 and 123 but be manufactured integratedly.

Moreover, in order to open and close the face vent 124a and the floor vent 124b which are intensively arranged in the discharge case 121, rotary shafts 125a of the mode door 125 are arranged in parallel with the assembly face A of the left and right body cases 111 and 112.

Furthermore, because the rotary shafts 125a of the mode door 125 are arranged in parallel with the assembly face A of the left and right body cases 111 and 112, an assembly face B of the front and rear auxiliary cases 122 and 123 of the discharge case 121 is arranged at a right angle to the assembly face A of the left and right body cases 111 and 112.

In the meantime, the left and right body cases 111 and 112 are assembled with each other in the width direction of the vehicle, and the front and rear auxiliary cases 122 and 123 are assembled with each other in the front and rear longitudinal direction of the vehicle. In this instance, the rotary shafts 125a of the mode door 125 are also arranged in the front and rear longitudinal direction of the vehicle, such that both end portions of the rotary shafts 125a are rotatably assembled to opposed side walls 121a and 121b of the front and rear auxiliary cases 122 and 123.

Additionally, the mode door 125 is a rotary door, and includes an air mixing zone 125b formed therein for mixing the cold air passing through the evaporator 101 and the warm air passing through the heater core 102.

In other words, the mode door 125 is formed in a dome shape along the interior circumference of the discharge case 121 from the rotary shafts 125a respectively joined to both side walls 121a and 121b of the front and rear auxiliary cases 122 and 123, such that the air mixing zone 125b is formed inside the mode door 125.

Accordingly, the air mixing zone 125b formed inside the mode door 125 can be utilized as an area for mixing cold air and warm air.

Therefore, the cold air passing through the evaporator 101 and the warm air passing through the heater core 102 move into the discharge case 121. In this instance, the cold air and the warm air are mixed together inside the air mixing zone 125b of the mode door 125, and then, the mixed air is supplied to the left and right sides inside the vehicle through the two face vents 124a formed in the both side walls 121a and 121b of the discharge case 121, such that the rear air conditioner can reduce a temperature difference of air which is discharged toward the left and right sides inside the vehicle due to an enhancement of mixability of the cold air and the warm air.

Moreover, the face vent 124a includes the left face vent 122a and the right face vent 123a respectively formed in the opposed side walls 121a and 121b of the front and rear auxiliary cases 122 and 123 for separately discharging the air toward the left and right sides inside the vehicle, and the floor vent 124b crosses the assembly face B of the front and rear auxiliary cases 122 and 123.

In this instance, the floor vent 124b is penetratively formed on a curved portion 121c having the assembly face B of the discharge case 121.

That is, the left face vent 122a and the right face vent 123a are formed in opposed side walls 121a and 121b of the discharge case 121, and the floor vent 124b is formed in one side wall (curved surface portion 121c) of the discharge case 121 at a right angle to the rotary shaft 125a of the mode door 125.

Therefore, the left face vent 122a and the right face vent 123a of the face vent 124a supply air toward the upper body of the passenger who sits on the rear seat by separately discharging air to the left and right sides inside the vehicle, and the floor vent 124b supplies air toward the lower body (toward the feet) of the passenger who sits on the rear seat.

Furthermore, according to the air discharge modes, the mode door 125 is rotated at a predetermined angle. In this instance, when the mode door 125 rotates toward the floor vent 124b, the floor vent 124b is closed and the left and right face vents 122a and 123a are opened, such that the air mixed in the air mixing zone 125b of the mode door 125 is discharged to the left and right face vents 122a and 123a. On the contrary, when the mode door 125 rotates toward the face vent 124a, the left and right vents 122a and 123a of the face vent 124a are closed and the floor vent 124b is opened, such that the air mixed in the air mixing zone 125b of the mode door 125 is discharged to the floor vent 124b.

As described above, because the left and right face vents 122a and 123a and the floor vent 124b are intensively arranged in the discharge case 121 and are all opened and closed by the single mode door 125 (rotary door), the air conditioner can be reduced in size and modulated so as to be enhanced in installability. Additionally, the rear air conditioner according to the preferred embodiment of the present invention can be reduced in the number of components and manufacturing costs.

In addition, duct connection parts 105 and 106 for connecting left and right ducts 140 and 150 are respectively disposed to the left face vent 122a and the right face vent 123a.

That is, the air discharged through the left face vent 122a and the air discharged through the right face vent 123a are respectively supplied to the left and right ducts 140 and 150 through the duct connection parts 105 and 106.

Moreover, the left duct 140 and the right duct 150 for supplying the air discharged from the duct connection parts 105 and 106 to the left and right sides inside the vehicle are respectively connected to the duct connection parts 105 and 106 respectively connected to the left and right face vents 122a and 123a.

Furthermore, in the drawings, the rear air conditioner 100 is installed at the side (right side) of the vehicle, and hence, the right duct 150 is shorter than the left duct 140.

In this instance, static pressure in a flow channel ranging from the right vent 123a to the right duct 150 is low because the right flow channel is short, but static pressure in a flow channel ranging from the left vent 122a to the left duct 140 is high because the left flow channel is long.

Therefore, the right face vent 123a which is relatively low in static pressure is smaller in opening area than the left face vent 122a which is relatively high in static pressure. In other words, because the left flow channel ranging from the left face vent 122 to the left duct 140 is high in static pressure, the left vent 122a is larger in size of opening area than the right vent 123a and has more air volume, so as to equalize air volumes supplied to the left and right sides inside the vehicle.

Moreover, a bypass passageway part 126 is formed at one side of the discharge case 121 for communicating with the air discharged through the left and right face vents 122a and 123a.

The bypass passageway part 126 is partitioned from the inside of the discharge case 121 and is formed side by side with the rotary shaft 125a of the mode door 125.

Additionally, the bypass passageway part 126 communicates the duct connection parts 105 and 106 which are respectively connected to the left and right vents 122a and 123a of the discharge case 121.

Furthermore, because the left face vent 122a and the right face vent 123a are different from each other in size of the opening areas, some of the discharged air of the left face vent 122a which is relatively more in air volume is supplied to the right face vent 123a through the bypass passageway part 126.

In other words, the air blown through the air blower 130 moves to the discharge case 121 after passing through the air-conditioning case 110, and then, is discharged through the left and right face vents 122a and 123a. In this instance, the air discharged through the right face vent 123a which is smaller than the left face vent 122a is faster in flow rate than the left face vent 122a, and due to the speed difference, some of the air discharged through the slower part, namely, the left vent 122a which is relatively larger, bypasses toward the right face vent 123a through the bypass passageway part 126 and is mixed with the air discharged through the right face vent 123a, and thus, the rear air conditioner according to the preferred embodiment of the present invention can enhance mixability of the air discharged to the left and right face vents 122a and 123a, reduce the temperature difference between the air discharged to the left side and the air discharged to the right side, and enhance the air flow distribution and temperature.

In the meantime, at least one edge of the left face vent 122a which is relatively larger in size of the opening area than the right face vent 123a coincides with the center of the rotary shaft 125a of the mode door 125. Namely, in the drawings, the left face vent 122a which is relatively larger in size of the opening area is formed in an arc shape, and in this instance, the center of the arc coincides with the center of the rotary shaft 125a.

Additionally, it is preferable that the edge of the left face vent 122a formed at the center of the arc be formed adjacent to the rotary shaft 125a.

Moreover, an actuator 160 for operating the mode door 125 is mounted in the discharge case 121.

The actuator 160 is mounted on one side wall 121b of the discharge case 121 where the vent having the lower static pressure is located.

In the drawing, because the right face vent 123a is lower in static pressure than the left face vent 122a, the actuator 160 is mounted on one side wall 121b of the discharge case 121 where the left face vent 123a is formed.

Furthermore, because the right face vent 123a is lower in static pressure and smaller than the left face vent 122a, when the actuator 160 is mounted on the side wall 121b of the discharge case 121 where the right face vent 123a is formed, the actuator 160 does not stop the right face vent 123a, and hence, it can prevent reduction of air volume.

If the actuator 160 is mounted on the other side wall 121a of the discharge case 121 where the left face vent 122a is formed, the actuator 160 stops the left face vent 122a which is bigger than the right face vent 123a, and thus, the air volume is reduced.

In the meantime, it is preferable that the actuator 160 be mounted at an external area of the right face vent 123a, which is lower in static pressure and is smaller than the left face vent 122a, on one side wall 121b of the discharge case 121 so as not to stop the right face vent 123a.

Additionally, the actuator 160 is mounted on the side wall 121b of the discharge case 121 where the right face vent 123a having the lower static pressure is formed and the left face vent 122a having the higher static pressure is increased in size, so as to control the air flow distribution and temperature.

That is, because it is difficult to increase the size of the right face vent 123a on the side wall 121b of the discharge case 121 where the actuator 160 is mounted, there is no additional interference components, and thus, the left face vent 122a which is relatively adjustable in size is increased in size so as to control the air flow distribution and temperature.

Figure 12:
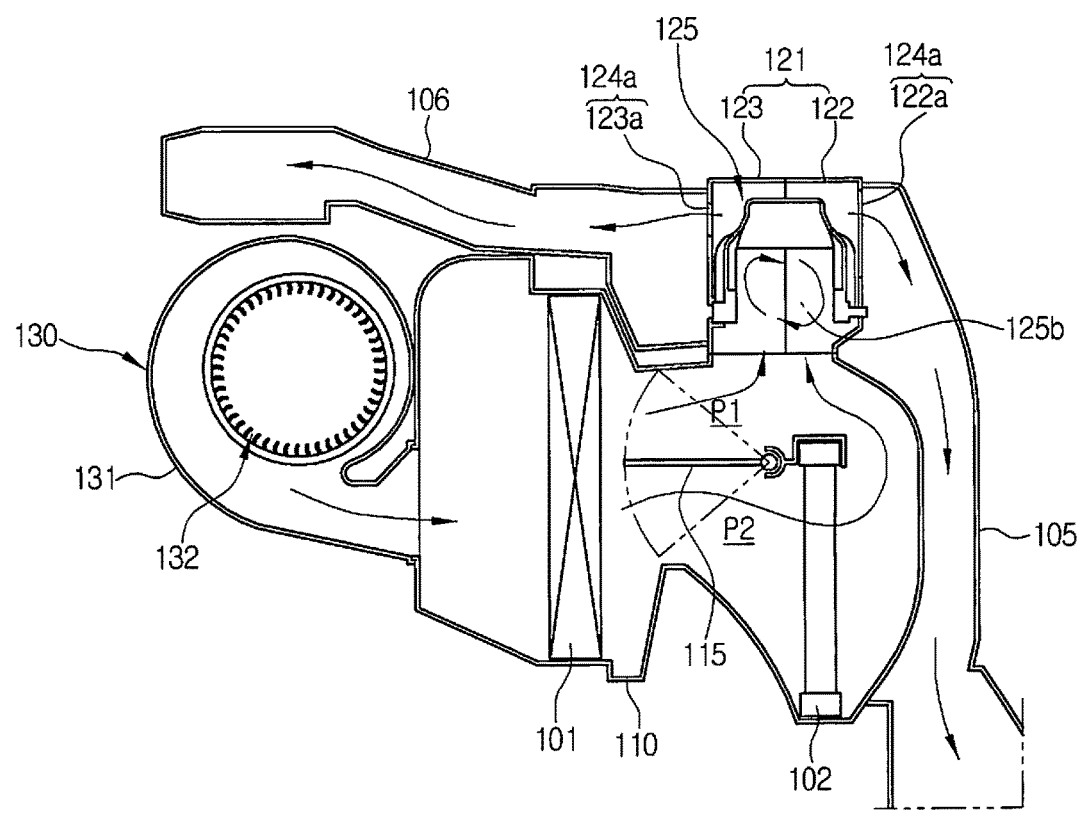
FIG. 12 is a sectional view of the rear air conditioner according to the preferred embodiment of the present invention.

Hereinafter, the action of the rear air conditioner for the vehicle according to the preferred embodiment of the present invention will be described, and for convenience's sake, referring to FIG. 12, the case that the air discharge mode is the face mode will be described.

First, in the face mode, the mode door 125 opens the left and right vents 122a and 123a of the face vent 124a and closes the floor vent 124b.

Moreover, the temperature-adjusting door 115 adjusts the degrees of opening of the cold air passageway P1 and the warm air passageway P2 according to the cooling mode, the heating mode and the mixing mode. FIG. 12 illustrates the mixing mode to open all of the cold air passageway P1 and the warm air passageway P2.

Continuously, when the air blower 130 is operated, the air inhaled through the air inflow port 133 of the scroll case 131 is blown to the inside of the air-conditioning case 110.

The air blown to the inside of the air-conditioning case 110 is cooled while passing through the evaporator 101, and then, some of the cold air by the temperature-adjusting door 115 bypasses the heater core 102 and the other one is changed into warm air while passing through the heater core 102.

After that, the cold air and the warm air move toward the discharge case 121 through the air outflow port 116, and in this instance, the cold air and the warm air are mixed together in the air mixing zone 125b inside the mode door 125. After that, some of the air is discharged to the left face vent 122a, and the other is discharged to the right face vent 123a.

In this instance, the air discharged to the right face vent 123a which is lower in static pressure and is smaller becomes faster in speed, and due to the speed difference, some of the air discharged to the left face vent 122a bypasses toward the right face vent 123a through the bypass passageway part 126.

In the above process, some of the air discharged to the left face vent 122a is mixed with the air discharged to the right face vent 123a, such that the temperature difference between the left and right sides is reduced and the air flow distribution and temperature are enhanced.

Continuously, the air discharged to the left face vent 122a and the air discharged to the right face vent 123a are respectively supplied to the left and right sides inside the vehicle through the left duct 140 and the right duct 150 respectively connected to the duct connection parts 105 and 106.

What is claimed is:

1. A rear air conditioner for a vehicle comprising:
an air-conditioning case having left and right body cases, an air inflow port formed at one side and an air outflow port formed at the other side;
an evaporator and a heater core respectively mounted inside the air-conditioning case; and
a discharge module mounted on the air outflow port, wherein:
the discharge module comprises:
a discharge case having at least two face vents and a floor vent, both the at least two face vents and the floor vent configured to supply air discharged from the air outflow port toward a rear seat inside the vehicle; and
a mode door having a rotary shaft that is mounted inside the discharge case and configured to adjust the degrees of opening of the at least two face vents and the floor vent;
the discharge case is constructed of front and rear auxiliary cases which are assembled together;
the at least two face vents include a left face vent and a right face vent formed on walls of the front and rear auxiliary cases, respectively, and configured to separately discharge the air to the left and right sides inside the vehicle;
a bypass passageway part is formed in one side of the discharge case for communicating the air discharged through the left face vent and the air discharged through the right face vent with each other; and
the left face vent and the right face vent have differently sized opening areas, such that some of the air discharged through the face vent having the larger opening area is routed through the bypass passageway part to join with the air discharged through the face vent having the smaller opening area.

2. The rear air conditioner according to claim 1, wherein the mode door is a rotary door and includes an air mixing zone formed inside the rotary door for mixing the cold air passing through the evaporator and the warm air passing through the heater core together.

3. The rear air conditioner according to claim 1, wherein the floor vent is formed in one side wall of the discharge case at a right angle to the rotary shaft of the mode door.

4. The rear air conditioner according to claim 1, wherein at least one edge of the left face vent which is relatively larger in size of the opening area than the right face vent coincides with the center of the rotary shaft of the mode door.

5. The rear air conditioner according to claim 1, wherein the bypass passageway part is partitioned from the inside of the discharge case and is formed in parallel with the rotary shaft of the mode door.

6. The rear air conditioner according to claim 1, wherein the air outflow port is positioned where cold air passing through the evaporator and warm air passing through the heater core meet together.

7. The rear air conditioner according to claim 1, wherein an assembly face of the front and rear auxiliary cases is arranged at a right angle to an assembly face of the left and right body cases, and the rotary shaft of the mode door is arranged in parallel to the assembly face of the left and right body cases and are rotatably mounted on opposed side walls of the front and rear auxiliary cases.

8. The rear air conditioner according to claim 7, wherein the floor vent is formed on the assembly faces of the front and rear auxiliary cases.

9. The rear air conditioner according to claim 7, wherein ducts are connected to the left face vent and the right face vent, respectively, to supply the air discharged from the at least two face vents toward the left and right sides inside the vehicle, and the duct connected to the face vent having the smaller opening area is shorter than the duct connected to the face vent having the larger opening area.

10. The rear air conditioner according to claim 7, wherein an actuator for operating the mode door is mounted on the discharge case.

11. The rear air conditioner according to claim 10, wherein the actuator is mounted on one side wall of the discharge case where the face vent having the smaller opening area is located.

* * * * *